United States Patent [19]

Angell et al.

[11] Patent Number: 5,824,433
[45] Date of Patent: Oct. 20, 1998

[54] HIGH CONDUCTIVITY ELECTROLYTE SOLUTIONS AND RECHARGEABLE CELLS INCORPORATING SUCH SOLUTIONS

[75] Inventors: Charles Austen Angell, Mesa; Sheng-Shui Zhang, Tucson; Kang Xu, Tempe, all of Ariz.

[73] Assignee: Arizona Board of Regents, Tempe, Ariz.

[21] Appl. No.: 748,009

[22] Filed: Nov. 12, 1996

[51] Int. Cl.$^6$ ................................................ H01M 6/14
[52] U.S. Cl. ........................ 429/194; 429/198; 429/199; 252/62.2; 423/300; 423/301; 423/302; 423/303; 423/304
[58] Field of Search ................... 252/62.2; 423/300–304; 429/194, 198, 199

[56] References Cited

U.S. PATENT DOCUMENTS

| | | | |
|---|---|---|---|
| 4,163,829 | 8/1979 | Kronenberg | 429/194 |
| 4,515,875 | 5/1985 | Bowden et al. | 429/196 |
| 4,608,322 | 8/1986 | Howard et al. | 429/199 |
| 4,740,436 | 4/1988 | Kobayashi et al. | 429/194 |
| 4,780,380 | 10/1988 | Prater | 429/199 |
| 4,839,249 | 6/1989 | Jones et al. | 429/199 |
| 5,183,716 | 2/1993 | Nakacho et al. | 429/199 |

OTHER PUBLICATIONS

Xu, Kang et al. Inorganic electrolyte solutions and gels for rechargeable lithium batteries, 1996 (no month available), 143(9), L209–L211, Journal Electrochem Soc.

Auborn, J.J., French, K.W., Lieberman, S.I., Shah, V.K., and Heller, A., "Lithium Anode Cells Operating at Room Temperature in Inorganic Electrolytic Solutions", J. Electrochem. Soc., Vol. 120, No. 12, 1973, pp. 1613–1619. No month available.

Bates, J.B., Lubben, D., Dudney, N.J., and Hart, F.X., "5 Volt Plateau in $LiMn_2O_4$ Thin Films", J. Electrochem. Soc., Vol. 142, No. 9, 1995, pp. L149–L151. No month available.

Ciemiecki, K.T. and Auborn, J.J., "Relative Electrochemical Stability of Lithium and Aluminum Salts and their Solvents.", in *Proceedings of the Symposium on Lithium Batteries*, Dey, A.N., Editor, PV 84–1, pp. 363–373. No date available.

Dey, A.N., Kuo, H.C., Piliero, P., and Kallianidis, M., "Inorganic Electrolyte $Li/SO_2$ Rechargeable System: Development of a Prototype Hermetic C Cell and Evaluation of Its Performance and Safety Characteristics.", J. Electrochem. Soc., vol. 135, No. 9, 1988, pp. 2115–2120. No month available.

Fuller J., Osteryoung, R.A., and Carlin, R.T., "Rechargeable Lithium and Sodium Anodes in Chloroaluminate Molten Salts Containing Thionyl Chloride", J. Electrochem. Soc., vol. 142, No. 11, 1995, pp. 3632–3636. No month available.

Hedges, W.M., Pletcher, D., and Gosden, C., "Microelectrode Studies of the $Li/Li^+$ Couple in $SoCl_2/LiAlCl_4$", J. Electrochem. Soc., Vol. 134, No. 6, 1987, pp. 1334–1340. No month available.

Hossain, S., "Rechargeable Lithium Batteries (Ambient Temperature)", in *Handbook of Batteries*, $2^{nd}$ ed., Linden, D., Editor, Chap. 36, McGraw–Hill, New York (1995). No month available.

Peramunage, D., Pasqualriello, D.M., and Abraham, K.M., "Polyacrylonitrile–Based Electrolytes with Ternary Solvent Mixtures as Plasticizers", J. Electrochem. Soc., vol. 142, No. 6, 1995, pp. 1789–1798. No month available.

Reiche, A., Steurich, T., Sandner, B., Lobitz, P., and Fleischer, G. "Ion Transport in Gel Electrolytes", Electrochim. Acta, vol. 40, No. 13–14, 1995, pp. 2153–2157. No month available.

Senapati, H., Kadiyala, R.K., and Angell, C.A., "Single and Two–Step Calorimetric Studies of Crystallization Kinetics in Simple Ionic Glass–Forming Liquids. 1. $Ca(NO_3)_2$–$KNO_3$ System", J. Phys. Chem., vol. 95, 1991, pp. 7050–7054. No month available.

Tarascon, J.M., and Guyomard, "New Electrolyte Compositions Stable Over the 0 to 5 V Voltage Range and Compatible with the $Li_{1+x}Mn_2O_4$/Carbon–Li–ion Cells", Solid Stae Ionics, vol. 69, 1994, pp. 293–305. No month available.

Xu, K., Wan, G., and Tsuchida, E., "Ion Transport in Copolymers of Oligo(oxyethylene) Methacrylates with Monomers Having Polar Group", Polym. Adv. Technol., vol. 3, 1995, pp. 67–74. No month available.

Xu, K., Zhang, S., and Angell, C.A., "Room Temperature Inorganic Quasi–Molten Salts as Alkali–Metal Electrolytes", J. Electrochem. Soc., vol. 143, No. 11, 1996, pp. 3548–3554. No month available.

*Primary Examiner*—Bruce F. Bell
*Attorney, Agent, or Firm*—Morrison & Foerster LLP

[57] ABSTRACT

This invention relates generally to electrolyte solvents for use in liquid or rubbery polymer electrolyte solutions as are used, for example, in electrochemical devices. More specifically, this invention relates to sulfonyl/phosphocompound electrolyte solvents and sulfonyl/phosphocompound electrolyte solutions incorporating such solvents.

10 Claims, 9 Drawing Sheets

0.10 LiAlCl$_4$-0.90 Cl$_3$P=N-P(O)Cl$_2$

Figure 5

○ 0.15 LiAlCl$_4$-0.85CH$_3$SO$_2$Cl
□ 0.15 LiAlCl$_4$-0.85CH$_3$SO$_2$Cl
  with 8% wt of PMMA

Figure 6

0.10 LiN(SO$_2$CF$_3$)$_2$ and 0.90 CH$_3$SO$_2$Cl
Scan Rate: 10 mV/s
Ref: Li/Li$^+$
Counter and Working: Pt

Figure 7

0.12 LiAlCl$_4$ and 0.88 CH$_3$SO$_2$Cl
Scan Rate: 10 mV/s
Ref: Li/Li$^+$
Counter and Working: Pt

Figure 8

Li/PesLi10/Li$_x$Mn$_2$O$_4$; i$_c$=i$_d$=0.1 mA/cm$^2$
Cathode Area~1cm$^2$(ca.0.008 gram)

Figure 9

HIGH CONDUCTIVITY ELECTROLYTE SOLUTIONS AND RECHARGEABLE CELLS INCORPORATING SUCH SOLUTIONS

GOVERNMENT LICENSE RIGHTS

The U.S. Government has a paid-up license in this invention, and the right in limited circumstances to require the patent owner to license others on reasonable terms as provided for by the terms of DOE Contract No. DE-FG02-89ER45398, awarded by the Department of Energy.

RELATED APPLICATION

The present application is a nonprovisional application which claims priority rights under 35 U.S.C. § 119(e) based on U.S. provisional Pat. application Ser. No. 60/006,436, filed on Nov. 13, 1995.

INTRODUCTION

This invention relates generally to electrolyte solvents for use in liquid or rubbery polymer electrolyte solutions as are used, for example, in electrochemical devices. More specifically, this invention is directed to sulfonyl/phospho-compound electrolyte solvents and sulfonyl/phospho-compound electrolyte solutions incorporating such solvents.

BACKGROUND OF THE INVENTION

Typical electrolyte solvents for use in liquid or polymer electrolyte solutions include alkyl ethers such as dimethyl ether, diethyl ether, dioxalane, diglyme and tetraglyme; and alkene carbonates such as ethylene carbonate (hereinafter "EC") and propylene carbonate (hereinafter "PC"). These solvents are used to dissolve electrolyte solutes and/or rubberizing polymer additives to form electrolyte solutions which may be used in electrochemical devices.

Both alkyl ethers and alkene carbonates present significant disadvantages as electrochemical solvents. Specifically, alkyl ethers are relatively volatile, and therefore may evaporate over time. This is a disadvantage in any electrochemical device that is meant to operate for an extended period of time because evaporation of the solvent may change the electrical behavior of the device. Furthermore, such volatile solvents present fire hazards.

Moreover, alkyl ethers typically have low dielectric constants which discourage solvation of electrolyte salts. Therefore, alkyl ethers generally depend on cation chelation effects to dissolve significant amounts of electrolyte salts. Such compositions, containing limited amounts of electrolyte, tend to have a limited number of available charge carrier ions.

Alkene carbonates have higher dielectric constants than alkyl ethers, and therefore are better electrolyte solvents for liquid or polymer electrolytes. However, PC is not a suitable solvent because it is unstable in the presence of alkali metals, and forms a passivating layer on lithium. EC is also problematic because its melting point is above room temperature, and therefore it must be mixed with compounds that lower its melting temperature to obtain a liquid or rubbery electrolyte.

It has never heretofore been appreciated that the relatively involatile sulfonyl/phospho-compound electrolyte solvents according to the invention would function as advantageous non-aqueous electrolyte solvents.

SUMMARY OF THE INVENTION

The present invention relates to sulfonyl/phospho-compound electrolyte solvents and electrolyte solutions incorporating such solvents. The present invention further relates to rechargeable batteries and other electrochemical devices which utilize electrolyte solutions.

The sulfonyl-compound electrolyte solvents according to the present invention include compounds having the formula (I) shown below:

wherein X is a halide, and R is an alkyl group, a perfluorinated alkyl group, a perchlorinated alkyl group, or —N=PX$_3$. The phospho-compound electrolyte solvents according to the present invention further include compounds having the formula (II) shown below:

wherein X is a halide, and R is —P(O)X$_2$ or a 1–6 carbon alkyl group.

More preferable sulfonyl/phospho-compound electrolyte solvents according to formula (I) include Cl$_3$PNSO$_2$Cl, CH$_3$SO$_2$Cl and CF$_3$(CF$_2$)$_3$SO$_2$F.

More preferable sulfonyl/phospho-compound electrolyte solvent according to formula (II) are Cl$_3$PNP(O)Cl$_2$, Cl$_3$PNCH$_3$ or Cl$_3$PNCH$_2$CH$_3$.

Sulfonyl/phospho-compound electrolyte solutions according to the present invention comprise an electrolyte solute (such as an electrolyte salt) dissolved in a sulfonyl/phospho-compound electrolyte solvent. Preferable electrolyte solutes include alkali cation-containing salts. More preferable electrolyte solutes include LiAlCl$_4$, LiN(SO$_2$CF$_3$)$_2$ and their corresponding sodium analogs. The sulfonyl/phospho-compound electrolyte solutions according to the present invention comprise less than 50 mole percent, and preferably less than 30 mole percent electrolyte solute.

The sulfonyl/phospho-compound electrolyte solutions according to the present invention are particularly advantageous because they:

(i) exhibit high electrochemical stability;
(ii) are either involatile (boiling point>300° C.) or relatively involatile (e.g. CH$_3$SO$_2$Cl, boiling point=165° C.);
(iii) are capable of dissolving large mole fractions of most electrolyte solutes, including alkali metal salts, to provide high room temperature conductivity electrolyte solutions which maintain relatively high conductivity at temperatures below 0° C.;
(iv) do not crystallize at temperatures above 0° C.;
(v) exhibit wide electrochemical windows, thus enabling use in cells with high reducing potential anodes and high oxidizing potential cathodes; and
(vi) are stable in the presence of alkali metals.

In a further advantageous embodiment of the invention, the sulfonyl/phospho-compound electrolyte solutions may further comprise a high molecular weight polymer which imparts a rubbery consistency to the solution. Such rubbery electrolytes are commonly referred to as "gel electrolytes."

The above-mentioned sulfonyl/phospho-compound electrolyte solutions and gel electrolytes may be employed as electrolytes in most any type of electrochemical device.

These and other features, aspects and advantages of the present invention will become better understood with reference to the following description, and accompanying drawings.

DETAILED DESCRIPTION OF THE INVENTION

As used herein, the term "sulfonyl/phospho-compound electrolyte solvent" refers to a compound according to the above-mentioned formula (I) or formula (II).

As used herein, the term "electrolyte solute" refers to a conductive species, such as a salt, which behaves as an electrolyte (i.e., transports an electric current via long-range motion of ions), and may be dissolved in the sulfonyl/phospho-compound electrolyte solvent.

As used herein, the term "sulfonyl/phospho-compound electrolyte solution" refers to a composition comprising an electrolyte solute dissolved in a sulfonyl phospho-compound electrolyte solvent.

Sulfonyl/phospho-compound electrolyte solvents according to the present invention are preferably $Cl_3PNSO_2Cl$, $CH_3SO_2Cl$, $CF_3(CF_2)_3SO_2F$, $Cl_3PNP(O)Cl_2$, $Cl_3PNCH_3$ or $Cl_3PNCH_2CH_3$.

As shown in Examples 1 and 2, $Cl_3PNSO_2Cl$ and $Cl_3PNP(O)Cl_2$ were prepared by reacting $NH_2SO_3H$ and $(NH_4)_2SO_4$, respectively, with $PCl_5$. $CF_3(CF_2)_3SO_2F$ and $CH_3SO_2Cl$ are both commercially available from the Aldrich Chemical Company.

Sulfonyl/phospho-compound electrolyte solutions were prepared by dissolving weighed amounts of electrolyte solutes in sulfonyl/phospho-compounds. These solutions are prepared in a glove box under an inert atmosphere as described in Example 5. Sulfonyl/phospho-compound electrolyte solutions according to the invention comprise less than 50% and preferably less than 30% electrolyte solute.

Ionic conductivities of the sulfonyl/phospho-compound electrolyte solutions were determined from complex impedance plots obtained using a HEWLETT-PACKARD Model HP4192A—Frequency Analyzer. Measurements were automated to cover a predetermined temperature range at a sequence of temperatures controlled by a EUROTHERM temperature controller.

Figure 6:
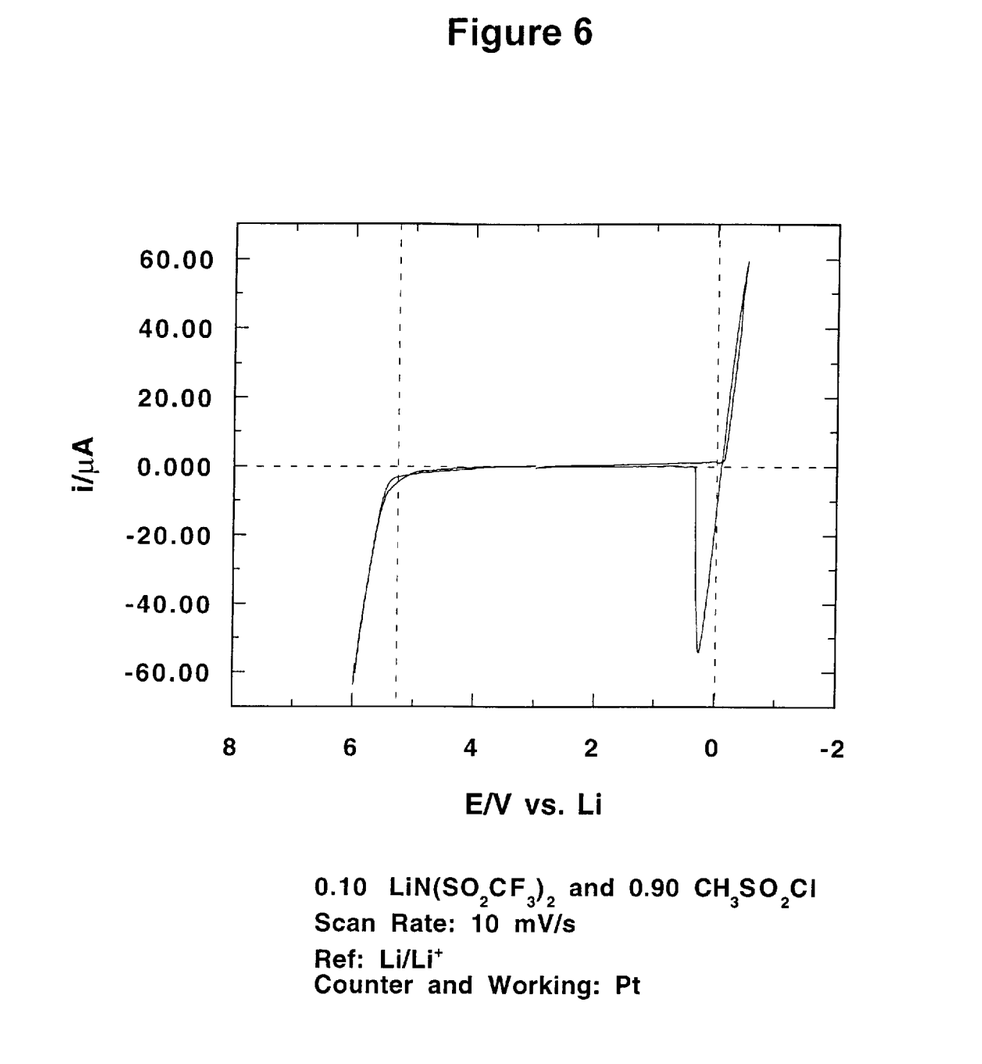
FIG. 6 is a cyclic voltammogram for a solution of 10 mole percent $LiN(SO_2CF_3)_2$ in $CH_3SO_2Cl$.
Figure 7:
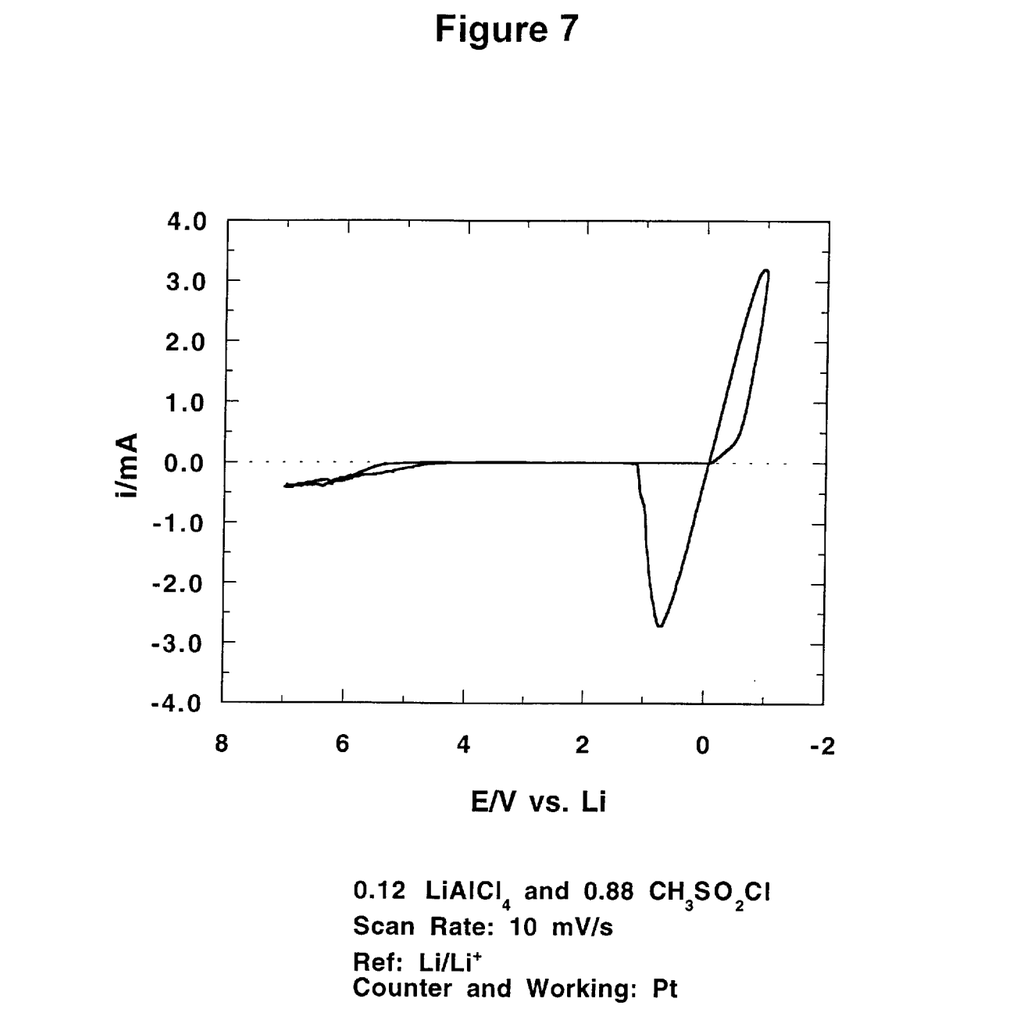
FIG. 7 is a cyclic voltammogram for a solution of 12 mole percent $LiAlCl_4$ in $CH_3SO_2Cl$.

The cyclic voltammograms shown in FIGS. 6 and 7 were obtained using a PAR Potentiometer. All scans were performed at room temperature with a scan speed of 10 mV/S. A $Li/Li^+$ reference electrode was used for all the scans.

As shown in Example 6, it may be desirable to add a small amount of high molecular weight polymer to a sulfonyl/phospho-compound electrolyte solution to impart a rubbery consistency to the electrolyte.

The sulfonyl/phospho-compound electrolyte solutions described herein are useful in all manner of electro-chemical devices which require electrolytes. Some examples of electrochemical devices which require electrolytes include batteries, fuel cells, photochromic displays, photovoltaic cells and gas sensors. This list is merely exemplary, and is not meant to limit the invention to any particular electrochemical device. The sulfonyl/phospho-compound electrolyte solutions of the present invention are especially useful as electrolytes for rechargeable cells as shown in Example 8.

Specific embodiments of the present invention will now be described in detail. These examples are intended to be illustrative, and the invention is not limited to the materials or amounts set forth in these embodiments.

EXAMPLE 1

Preparation of $Cl_3PNSO_2Cl$ $Cl_3PNSO_2Cl$ was synthesized by the following procedure: 546.5 grams (2.62 moles) of $PCl_5$ (purified by sublimation of commercial product obtained from the Aldrich Chemical Company) and 127.14 grams (1.31 moles) of $NH_2SO_3H$ (Aldrich, 99.8 percent), were ground and mixed in a 1000 ml flask equipped with a condenser, an $N_2$-inlet and an HCl-absorbing device. Under a flowing nitrogen atmosphere, the flask was heated in a water bath to near 100° C. until the above-mentioned solid reagents completely liquified. Most of the $POCl_3$ was removed by vacuum-distillation at a maximum temperature of 110° C. Then the remaining gold-colored oil was left to crystallize at room temperature. The crystallized product was washed several times with dry n-hexanes and recrystallized at about 5° C. The resultant product consisted of pale yellow needle crystals and had a melting point of about 35° C.

EXAMPLE 2

Preparation of $Cl_3PNP(O)Cl_2$ $Cl_3PNP(O)Cl_2$ was prepared by the following procedure. 300 grams (1.44 moles) of $PCl_5$ (Aldrich) was purified by sublimation. The $PCl_5$ was then ground together with 47.55 grams (0.36 moles) of $(NH_4)_2SO_4$ and mixed in a three-necked flask equipped with a gas inlet, a condenser and a drying tube. The mixture was heated up to 150° C. in an oil-bath under flowing nitrogen. Three hours later, the mixture was completely liquified. Then most of the low-boiling side products were removed by vacuum distillation. The final product was distilled at 160° C. under 0.5 mmHg. The product was a clear viscous liquid which slowly crystallized at room temperature.

EXAMPLE 3

Preparation of $Cl_3PNCH_3$ $Cl_3PNCH_3$ was prepared by the following procedure. 200 grams (0.96 moles) of $PCl_5$ (Aldrich) was purified by sublimation. The PCl$_5$ was then ground together with 64.75 grams (0.96 moles) of CH$_3$NH$_2$HCl (Aldrich, 98%) and mixed in a three-necked flask equipped with a gas inlet, a condenser and a drying tube. 200 mL of chlorobenzene was then added to this mixture. The mixture was refluxed under flowing nitrogen. After five hours, the mixture was allowed to cool. A white needle crystalline product precipitated. The crystals were separated by filtration and subsequently washed in toluene. After drying under vacuum, the crystals were further purified by sublimation. The final purified product was white needle crystals with a melting point of 178° C.

EXAMPLE 4

Preparation of Cl$_3$PNCH$_2$CH$_3$

Cl$_3$PNCH$_2$CH$_3$ was prepared by the following procedure. 200 grams (0.96 moles) of PCl$_5$ (Aldrich) was purified by sublimation. The PCl$_5$ was then ground together with 173.28 grams (0.96 moles) of CH$_3$CH$_2$NH$_2$HCl (Aldrich, 98%) and mixed in a three-necked flask equipped with a gas inlet, a condenser, an acid absorbing device and a drying tube. 200 mL of tetrachloroethane was added to the mixture, which was then heated to reflux under a nitrogen atmosphere. The flask was allowed to cool after HCl-evolution stopped. Most of the solvent was removed by vacuum distillation until a white needle crystalline product began to precipitate. The crystalline product was washed in toluene and dried under vacuum at room temperature.

EXAMPLE 5

Figure 1:
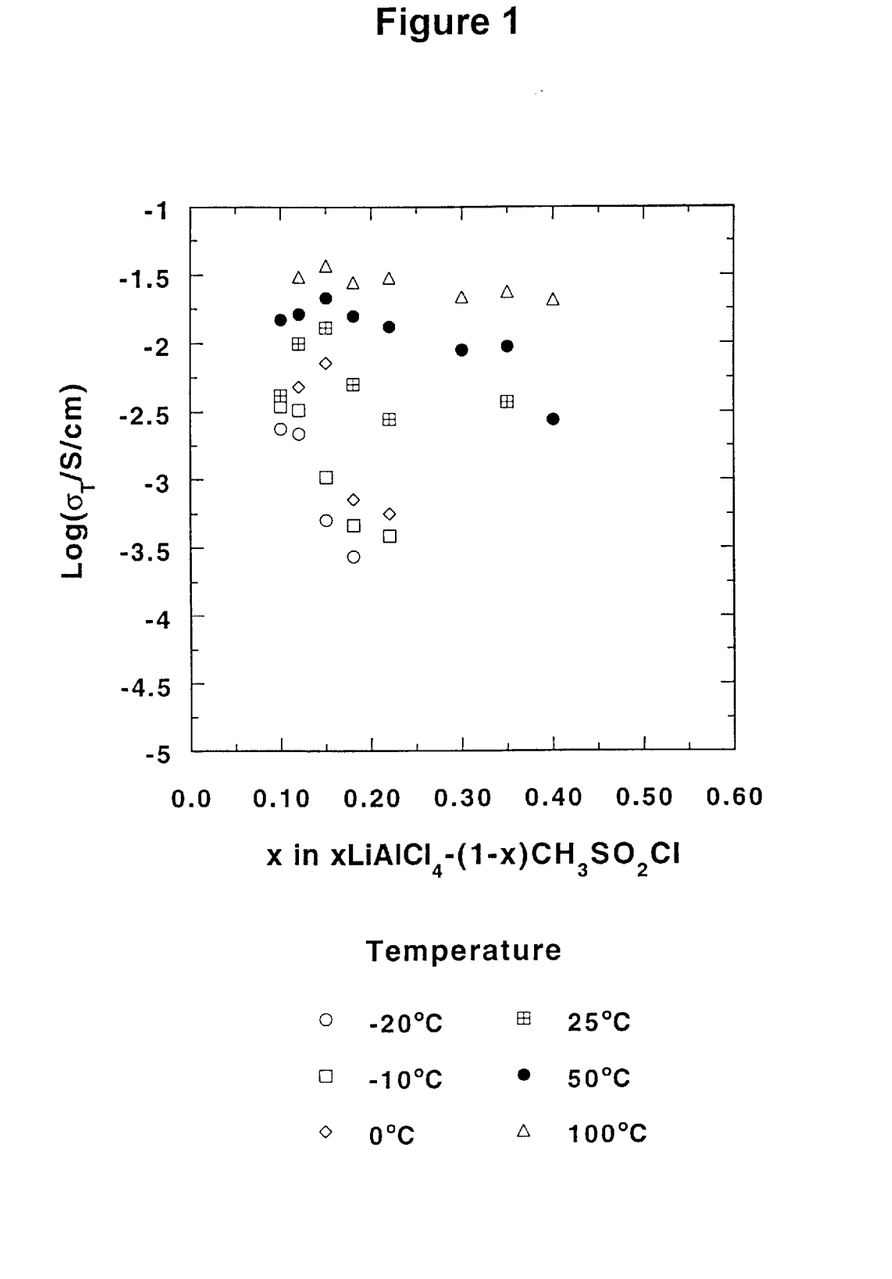
FIG. 1 is an overlay plot of log conductivity ($Scm^{-1}$) versus mole fraction of ($LiAlCl_4$) dissolved in $CH_3SO_2Cl$ at several different temperatures.
Figure 2:
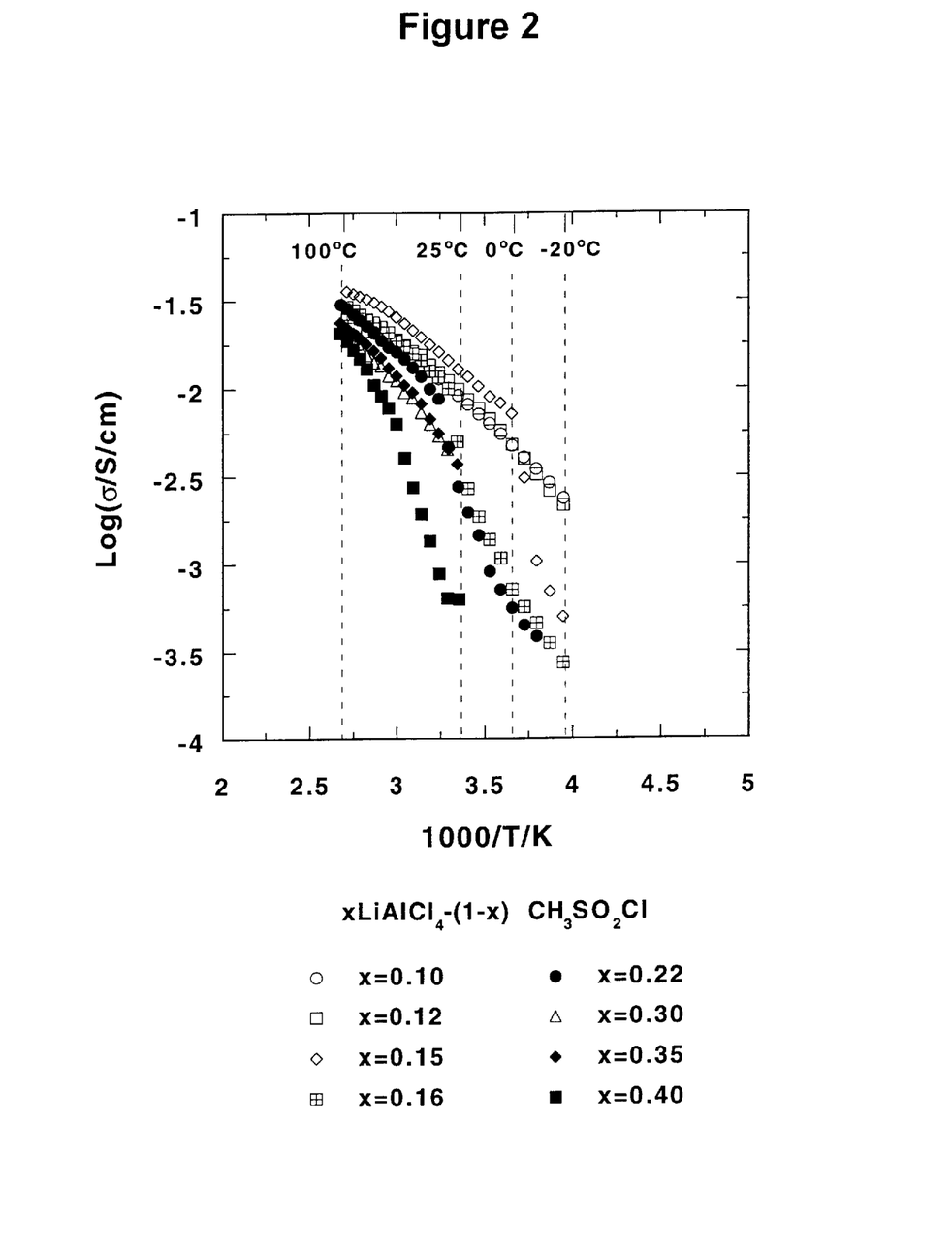
FIG. 2 is an overlay plot of log conductivity ($Scm^{-1}$) versus reciprocal temperature (K) for various mole fractions of $LiAlCl_4$ dissolved in $CH_3SO_2Cl$.

Preparation and Characterization of Sulfonyl/Phospho-Compound Electrolyte Solutions Solutions comprising from 10–40 mole percent LiAlCl$_4$ dissolved in CH$_3$SO$_2$Cl were prepared by weighing out appropriate amounts of LiAlCl$_4$ in a glove box and adding it to an appropriate amount of CH$_3$SO$_2$Cl. FIGS. 1 and 2 show that the room temperature conductivity of this solution approaches a maximum of $10^{-1.8}$ Scm$^{-1}$ at approximately 15 mole percent LiAlCl$_4$.

Figure 3:
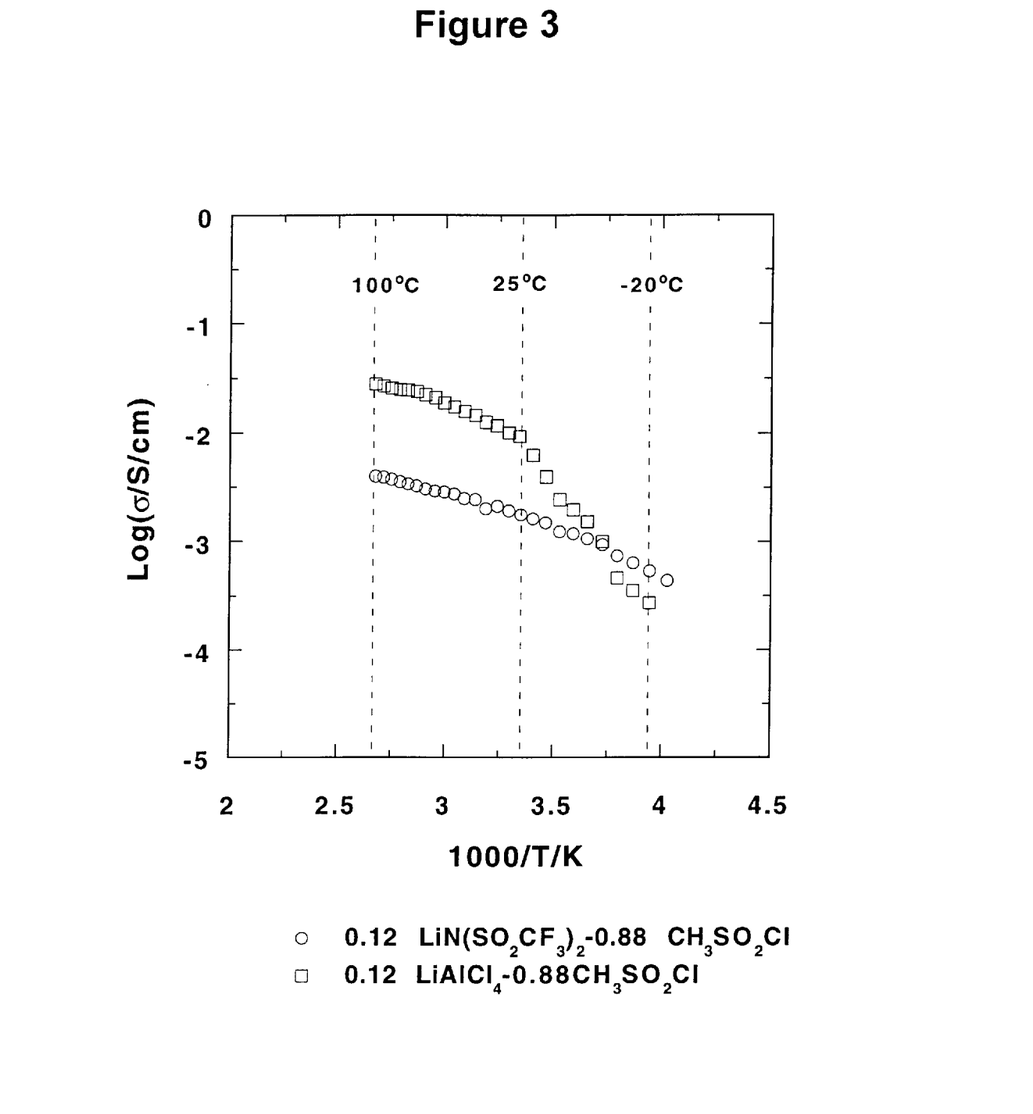
FIG. 3 is an overlay plot of log conductivity ($Scm^{-1}$) versus reciprocal temperature (K) for two electrolyte solutions containing 12 mole percent $LiN(SO_2CF_3)_2$ dissolved in $CH_3SO_2Cl$, and 12 mole percent $LiAlCl_4$ dissolved in $CH_3SO_2Cl$.

A solution comprising 12 mole percent LiN(SO$_2$CF$_3$)$_2$ dissolved in CH$_3$SO$_2$Cl was prepared by weighing out the appropriate ingredients in a glove box. FIG. 3 shows that the room temperature conductivity for the LiN(SO$_2$CF$_3$)$_2$ solution ($10^{-2.8}$Scm$^{-1}$) is lower than for an otherwise identical LiAlCl$_4$ solution.

Figure 4:
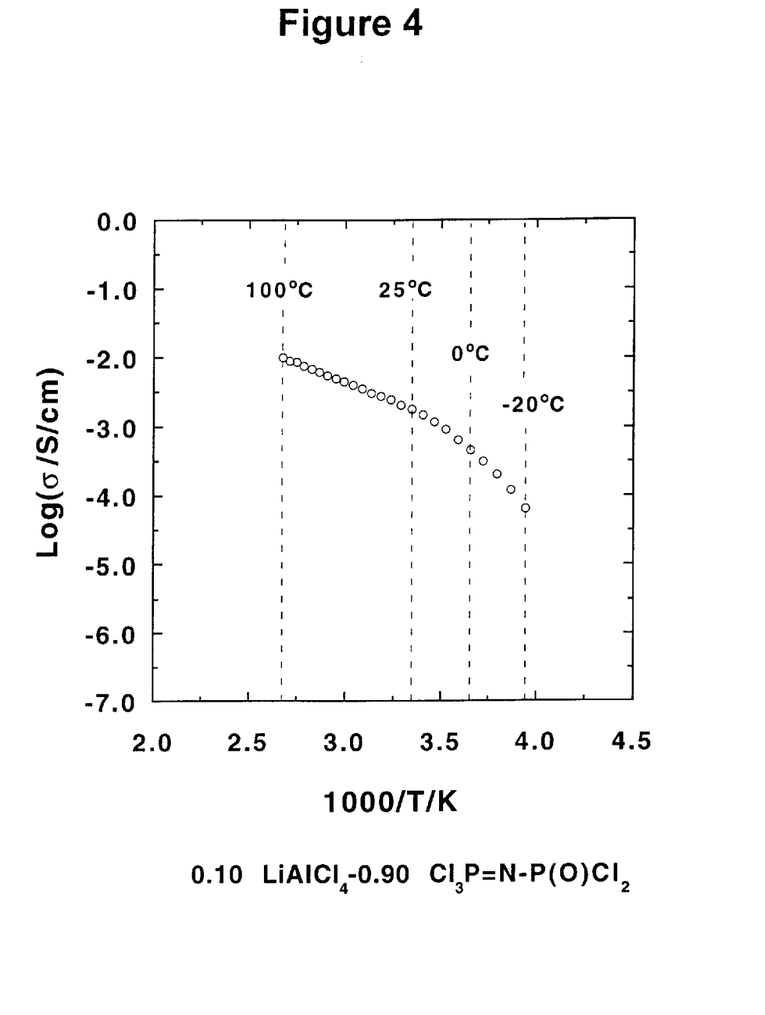
FIG. 4 is a plot of log conductivity ($Scm^{-1}$) versus reciprocal temperature (K) for an electrolyte solution containing 10 mole percent $LiAlCl_4$ dissolved in $Cl_3PNP(O)Cl_2$.

A solution comprising 10 mole percent LiAlCl$_4$ dissolved in Cl$_3$PNP(O)Cl$_2$ was prepared in a similar manner to the above-described solutions. FIG. 4 shows that the room temperature conductivity for this solution was $10^{-2.8}$Scm$^{-1}$.

EXAMPLE 6

Preparation and Characterization of a Rubberized Gel Electrolyte Solution

Figure 5:
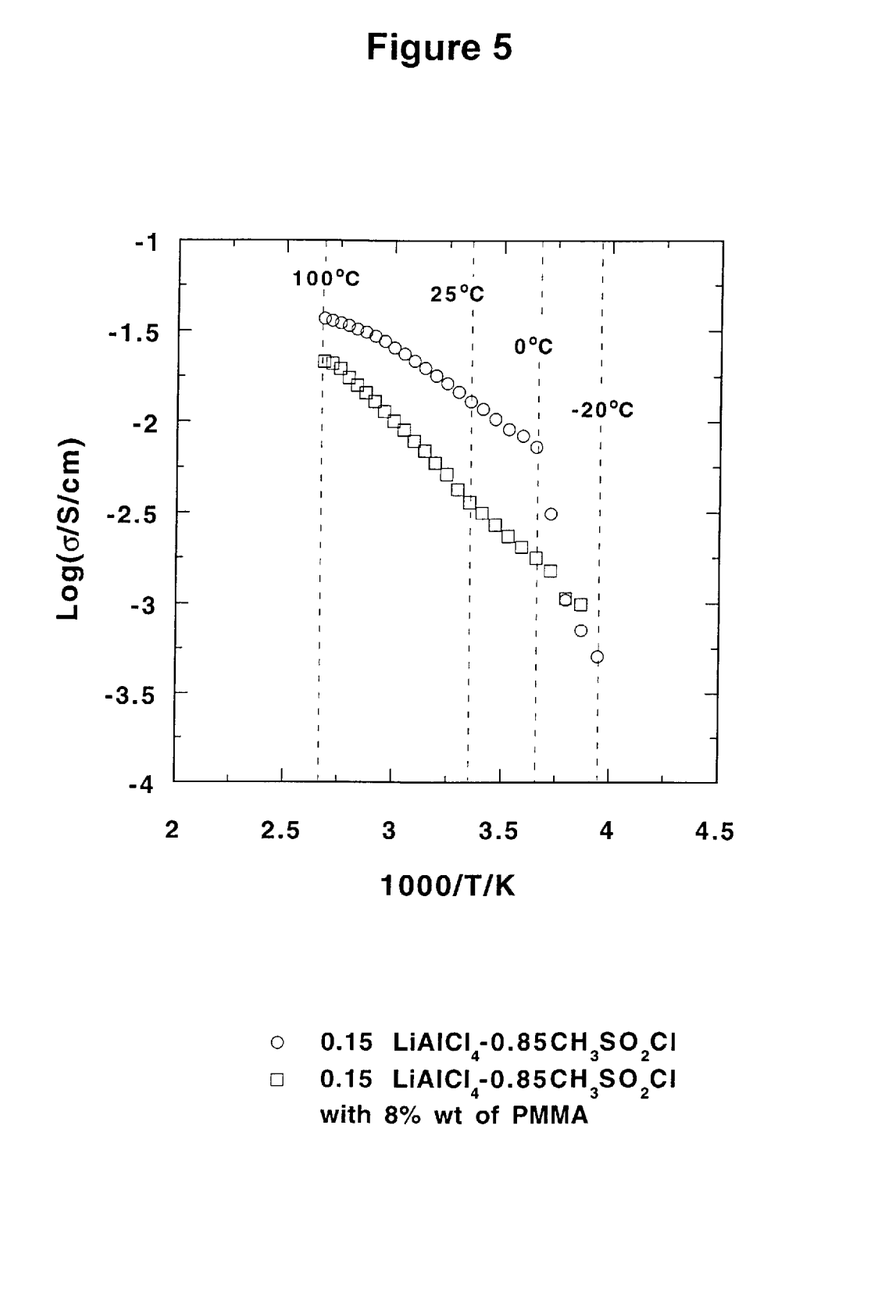
FIG. 5 is an overlay plot of log conductivity ($Scm^{-1}$) versus reciprocal temperature (K) for an electrolyte solution containing 15 mole percent $LiAlCl_4$ dissolved in $CH_3SO_2Cl$ compared to a solution further containing a high molecular weight polymer (polymethyl methacrylate ("PMMA")).

A solution of 15 mole percent LiAlCl$_4$ in CH$_3$SO$_2$Cl was prepared according to Example 3. Eight percent by weight high molecular weight polymer "PMMA" was added to the solution to form a rubberized gel. FIG. 5 shows that the conductivity decreased to $10^{-2.5}$S/cm$^{-1}$ upon adding the polymer. It is noted that the process responsible for the conductivity decrease below 0° C. in the 15 mole percent LiAlCl$_4$ solution has been suppressed by the addition of polymer.

EXAMPLE 7

Testing of Electrochemical Stability of the Sulfonyl/Phospho-Compound Electrolyte Solutions A solution comprising 10 mole percent LiN(SO$_2$CF$_3$)$_2$ in CH$_3$SO$_2$Cl was prepared as in Example 3. FIG. 6 shows that this solution has a wide electrochemical window of approximately 5.6 volts.

A second solution comprising 12 mole percent LiAlCl$_4$ in CH$_3$SO$_2$Cl was prepared as described in Example 5. FIG. 7 shows that this solution has a voltage window of about 4.8 volts. The electrochemical window is limited in the positive direction by deposition of Cl from the AlCl$_4^-$ anion, rather than by the solvent. A piece of lithium foil was placed in this solution and held for several days at temperatures of 100° C. The lithium foil remained shiny, indicating that the solutions are stable in the presence of alkali metals.

EXAMPLE 8

Figure 8:
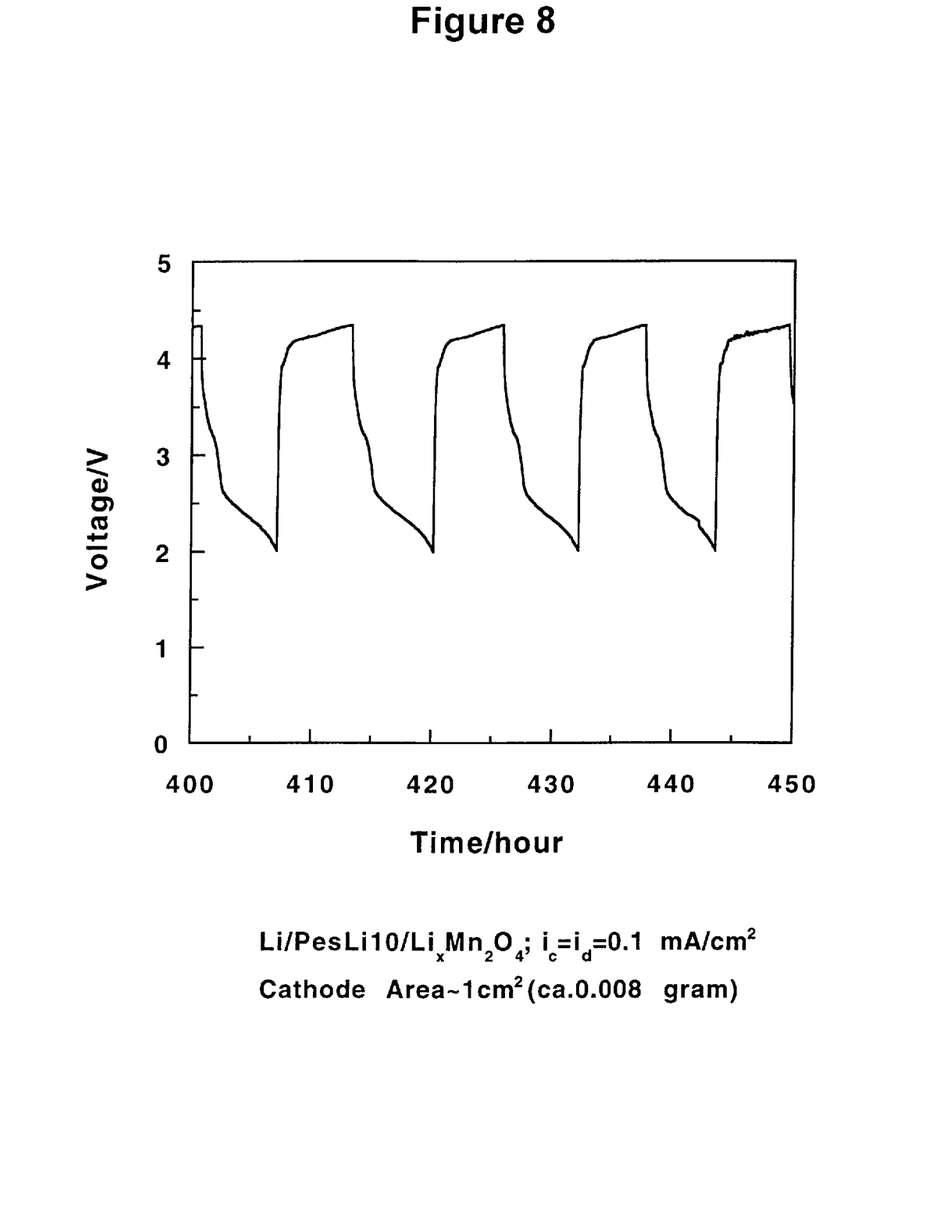
FIG. 8 is a plot of cell voltage versus time for several discharge/charging cycles for a Li/50 mole percent $LiAlCl_4$ dissolved in $Cl_3PNSO_2Cl/LiMn_2O_4$ battery.

A Rechargeable Li Battery Incorporating Sulfonyl/Phospho-Compound Electrolyte Solution A voltaic cell was formed using a Li foil anode and a cathode made from LiMn$_2$O$_4$, carbon black, and a binder, separated by a sulfonyl/phospho-compound electrolyte solution comprising 10 mole percent LiAlCl$_4$ dissolved in Cl$_3$PNSO$_2$Cl. FIG. 8 shows several discharge/charge/discharge cycles for this cell. This cell was cycled 50 times and showed no signs of deterioration. The cell exhibited a very high capacity of about 140 mAh per gram of LiMn$_2$O$_4$.

EXAMPLE 9

Figure 9:
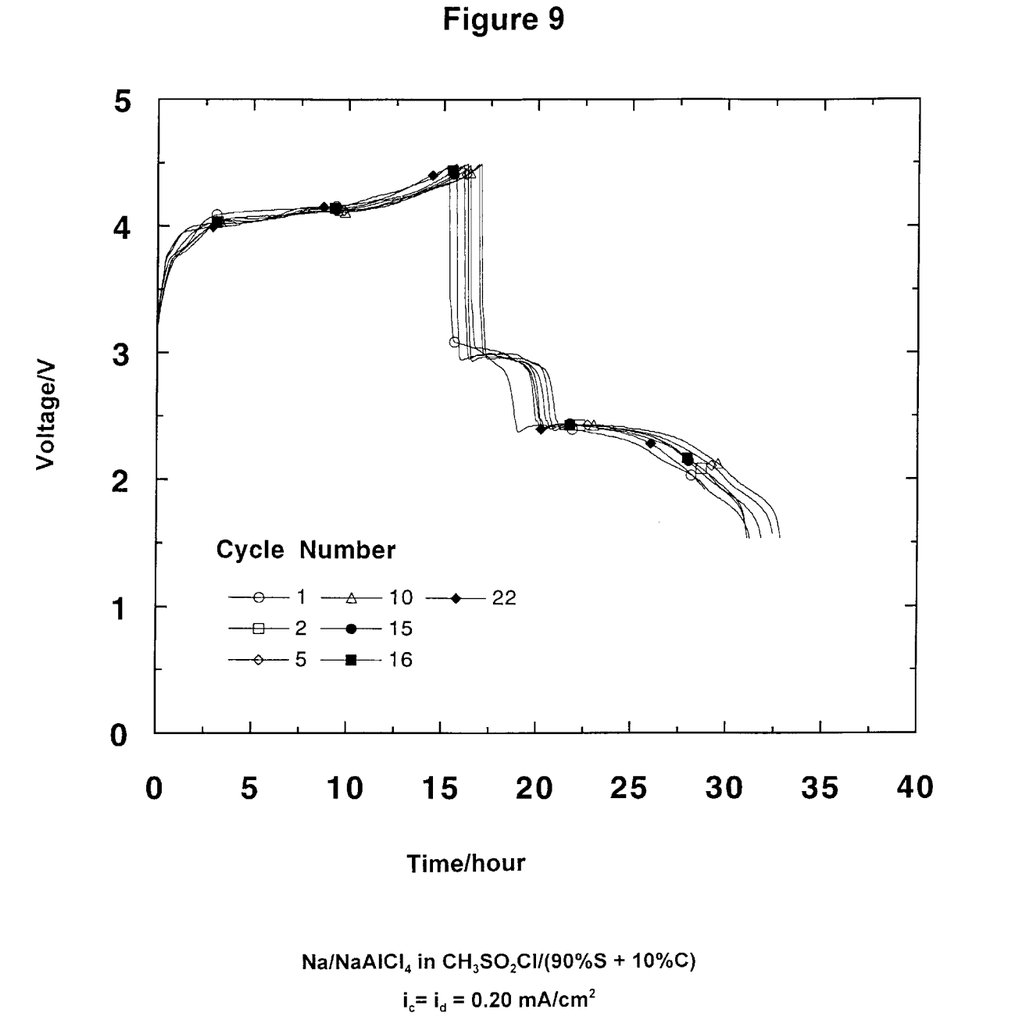
FIG. 9 is a plot of voltage versus time over several discharge cycles for a rechargeable Na—S battery incorporating sulfonyl/phospho-compound electrolyte solution.

A Rechargeable Na—S Battery Incorporating A Sulfonyl/Phospho-compound Electrolyte Solution A sulfur cathode was prepared by mixing 80% by weight sulfur, 15% by weight carbon black and 5% gel electrolyte to serve as a binder. The gel electrolyte was made according to Example 6, above with the exception that only 1% PMMA was used to ensure the electrolyte was a viscous liquid rather than a rubber. The resultant slurry was cast on a stainless steel substrate which served as a current collector. A voltaic cell was formed using a Na pellet anode and the above-described cathode separated by a sulfonyl/phospho-compound electrolyte solution containing 12 mole % NaAlCl$_4$ dissolved in CH$_3$SO$_2$Cl. The cell exhibited a reversible charge-discharge behavior over more than 20 cycles. FIG. 9 plots the discharge behavior of the above-described cell.

We claim:

1. A sulfonyl/phospho-compound electrolyte solvent selected from the group consisting of Cl$_3$PNSO$_2$Cl, Cl$_3$PNP (O)Cl$_2$, Cl$_3$PNCH$_3$ and Cl$_3$PNCH$_2$CH$_3$.

2. A sulfonyl/phospho-compound electrolyte solution which comprises:

(a) an electrolyte solute, and (b) a sulfonyl/phospho compound electrolyte solvent according to:

formula (I)

(I)

wherein

X is a halide, and

R is selected from the group consisting of a perfluorinated alkyl group, a perchlorinated group, and —N=PX$_3$, or formula (II):

wherein
X is a halide, and
R is —P(O)X$_2$ or a 1–6 alkyl group,
wherein the mole fraction of the electrolyte solute is less than 0.5.

3. A sulfonyl/phospho-compound electrolyte solution according to claim 2, wherein the electrolyte solute is a lithium salt.

4. A sulfonyl/phospho-compound electrolyte solution according to claim 3, which comprises a sulfonyl/phospho compound electrolyte solvent according to formula (I) which is selected from the group consisting of Cl$_3$PNSO$_2$Cl and CF$_3$(CF$_2$)$_3$SO$_2$F.

5. A sulfonyl/phospho-compound electrolyte solution according to claim 3, which comprises a sulfonyl/phospho compound electrolyte solvent according to formula (II) which is selected from the group consisting of Cl$_3$PNP(O)Cl$_2$, Cl$_3$PNCH$_3$ and Cl$_3$PNCH$_2$CH$_3$.

6. A sulfonyl/phospho-compound electrolyte solution according to claim 3, wherein the lithium salt is selected from the group consisting of LiAlCl$_4$ and LiN(SO$_2$CF$_3$)$_2$.

7. A sulfonyl/phospho-compound electrolyte solution according to claim 3, wherein the sulfonyl/phospho-compound electrolyte solvent further comprises up to 15% by weight of a high molecular weight polymer.

8. An electrochemical device which comprises a sulfonyl/phospho compound electrolyte solution comprising:

(a) an electrolyte solute, and
(b) a sulfonyl/phospho compound electrolyte solvent according to:

formula (I)

wherein
X is a halide, and
R is selected from the group consisting of a perfluorinated alkyl group, a perchlorinated group, and —N=PX$_3$, or formula (II):

wherein
X is a halide, and
R is —P(O)X$_2$ or a 1–6 alkyl group:
wherein the mole fraction of the electrolyte solute is less than 0.5.

9. An electrochemical device according to claim 8, wherein the electrolyte solute is a lithium salt.

10. An electrochemical device according to claim 9, wherein the sulfonyl/phospho-compound electrolyte solvent further comprises up to 15% by weight of a high molecular weight polymer.

* * * * *